United States Patent
Chen et al.

(10) Patent No.: US 10,691,731 B2
(45) Date of Patent: *Jun. 23, 2020

(54) EFFICIENT LOOKUP IN MULTIPLE BLOOM FILTERS

(71) Applicant: International Business Machines Corporation, Armonk, NY (US)

(72) Inventors: Chen Chen, Haifa (IL); Avraham Harpaz, Haifa (IL); Nir Naaman, Haifa (IL); Yoav Tock, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1196 days.

This patent is subject to a terminal disclaimer.

(21) Appl. No.: 14/952,938

(22) Filed: Nov. 26, 2015

(65) Prior Publication Data
US 2017/0154099 A1 Jun. 1, 2017

(51) Int. Cl.
*G06F 16/31* (2019.01)

(52) U.S. Cl.
CPC .................. *G06F 16/325* (2019.01)

(58) Field of Classification Search
CPC ....... G06F 16/325; G06F 16/316; G06F 16/31
See application file for complete search history.

(56) References Cited

U.S. PATENT DOCUMENTS

| | | | |
|---|---|---|---|
| 7,627,570 B2 | 12/2009 | Bosloy et al. | |
| 7,636,703 B2 * | 12/2009 | Taylor | H04L 63/0245 706/62 |
| 7,702,683 B1 * | 4/2010 | Kirshenbaum | G06F 16/152 707/758 |
| 9,646,035 B1 * | 5/2017 | Dickson | G06F 16/2477 |
| 2003/0026268 A1 * | 2/2003 | Navas | H04L 29/12009 370/400 |
| 2007/0168550 A1 | 7/2007 | Wang et al. | |
| 2011/0307659 A1 * | 12/2011 | Hans | G06F 3/0613 711/114 |

(Continued)

OTHER PUBLICATIONS

Patrick TH. Eugster et al., "The Many Faces of Publish/Subscribe", ACM Computing Surveys, vol. 35, No. 2, pp. 114-131, Jun. 2003.

(Continued)

*Primary Examiner* — Jay A Morrison
*Assistant Examiner* — Antonio J Caiado
(74) *Attorney, Agent, or Firm* — Ziv Glazberg

(57) ABSTRACT

A method comprising obtaining a Bloom filter array, wherein a size of a first Bloom filter is smaller than a size of a second Bloom filter and modifying at least a portion of the plurality of Bloom filters to create a modified Bloom filter array comprising a modified plurality of Bloom filters each of which having a same size, wherein the same size is greater than the size of the first Bloom filter, wherein said modifying comprises: duplicating the first Bloom filter to create a modified first Bloom filter comprising two or more concatenated copies of the first Bloom filter. The method may also include performing lookup in the Bloom filter array by computing a hash value of a key and accessing a bit in the hash value location in each Bloom filter of the modified Bloom filter array to determine lookup outcome in each Bloom filter.

14 Claims, 4 Drawing Sheets

(56) References Cited

U.S. PATENT DOCUMENTS

| | | | |
|---|---|---|---|
| 2012/0084459 A1* | 4/2012 | Wu | H04L 45/7453 709/238 |
| 2012/0310960 A1* | 12/2012 | Watanabe | G06F 16/901 707/756 |
| 2013/0268740 A1 | 10/2013 | Holt | |
| 2014/0067830 A1 | 3/2014 | Buhler et al. | |
| 2014/0244779 A1* | 8/2014 | Roitshtein | H04L 45/748 709/213 |
| 2015/0215236 A1* | 7/2015 | Joshi | G06F 16/2255 707/754 |

OTHER PUBLICATIONS

Venugopalan Ramasubramanian et al., "Corona: a high performance publish-subscribe system for the world wide web", NSDI'06 Proceedings of the 3rd conference on Networked Systems Design & Implementation—vol. 3 pp. 2-2, 2006.

Burton H. Bloom., "Space/time trade-offs in hash coding with allowable errors", Magazine Communications of the ACM CACM Homepage archive, vol. 13 Issue 7, Jul. 1970, pp. 422-426.

Li Fan et al., "Summary cache: a scalable wide-area web cache sharing protocol", Journal IEEE/ACM Transactions on Networking (TON), vol. 8 Issue 3, Jun. 2000, pp. 281-293.

Yi-Min Wang et al., "Subscription partitioning and routing in content-based publish/subscribe networks", DISC 2002.

Yaxiong Zhao et al., "B-SUB: A Practical Bloom-Filter-Based Publish-Subscribe System for Human Networks", In Proceedings of the 2010 IEEE 30th International Conference on Distributed Computing Systems (ICDCS '10).

Petri Jokela et al., "LIPSIN: line speed publish/subscribe internetworking", Proceeding SIGCOMM '09 Proceedings of the ACM SIGCOMM 2009 conference on Data communication, pp. 195-206, 2009.

Flavio Bonomi et al., "An Improved Construction for Counting Bloom Filters", Proceeding ESA'06 Proceedings of the 14th conference on Annual European Symposium—vol. 14, pp. 684-695, Springer-Verlag London, UK © 2006.

\* cited by examiner

EFFICIENT LOOKUP IN MULTIPLE BLOOM FILTERS

TECHNICAL FIELD

The present disclosure relates to efficient lookup in general, and to efficient lookup in a plurality of Bloom filters, in particular.

BACKGROUND

Efficient lookup is an important task in many computer information systems. Routing a message to a correct recipient may require efficient lookup in a routing data structure. Additionally or alternatively, retrieving stored information may also require lookup in a relevant data structure.

A Bloom filter is a probabilistic data structure that can represent set membership in an approximate manner. A Bloom filter responds to membership queries without false negatives, but may provide a false positive at a bounded rate. That is, a query to the filter on whether x is in the set is always correct if item x was inserted into the set S, but may err when the item x in not in S (false positive). Using Bloom filters to represent list of items that are being looked-up may provide significant space saving.

In some cases, multiple Bloom filters are used to represent a set of different lists. For example, each filter representing a different potential destination and a list of cases in which the message will be routed to that destination. As an example, in a cluster of servers, a Bloom filter may be used to determine whether to distribute a message to a certain server.

One major drawback of using multiple Bloom filters is that one needs to do multiple Bloom filter lookups to determine the correct routing. Performing a lookup into a Bloom filter incurs two main costs: first is the computation of up to k hash function values on the key string, and then the retrieval of up to k bits from memory, where each bit resides in address(k)=base+offset(k), where offset(k) is the index calculated by the k-th hash function.

BRIEF SUMMARY

One exemplary embodiment of the disclosed subject matter is a computer-implemented method performed by a processor, the method comprising: obtaining a Bloom filter array comprising a plurality of Bloom filters, wherein each Bloom filter of the plurality of Bloom filters is an array of bits having a size, wherein a size of a first Bloom filter of the plurality of Bloom filters is smaller than a size of a second Bloom filter of the plurality of Bloom filters; modifying at least a portion of the plurality of Bloom filters to create a modified Bloom filter array comprising a modified plurality of Bloom filters each of which having a same size, wherein the same size is greater than the size of the first Bloom filter, wherein said modifying comprises: duplicating the first Bloom filter to create a modified first Bloom filter comprising two or more concatenated copies of the first Bloom filter, wherein said modifying is performed by the processor; obtaining a key for performing lookup in the Bloom filter array; computing a hash value of the key using a hash function, wherein the hash value is computed using a modulo computation using the same size as a divisor for the modulo computation; and accessing a bit in the hash value location in each Bloom filter of the modified Bloom filter array to determine lookup outcome in each Bloom filter, whereby the module value is computed once for the Bloom filter array and reused for determining lookup outcome for each Bloom filter in the Bloom filter array.

Another exemplary embodiment of the disclosed subject matter is a computerized apparatus comprising a memory, wherein said memory retains a Bloom filter array comprising a plurality of Bloom filters, each of which having a same size; wherein at least one Bloom filter of the plurality of Bloom filters comprises two or more identical copies of bit arrays concatenated in sequence which are the outcome of duplicating an original Bloom filter; and a processor, wherein said processor is configured to: obtain a key for performing lookup in the Bloom filter array; computing a hash value of the key using a hash function, wherein the hash value is computed using a modulo computation using the same size as a divisor for the modulo computation; and accessing a bit in the hash value location in each Bloom filter of the Bloom filter array to determine lookup outcome in each Bloom filter.

Yet another exemplary embodiment of the disclosed subject matter is a computerized apparatus having a processor, the processor being adapted to perform the steps of: obtaining a Bloom filter array comprising a plurality of Bloom filters, wherein each Bloom filter of the plurality of Bloom filters is an array of bits having a size, wherein a size of a first Bloom filter of the plurality of Bloom filters is smaller than a size of a second Bloom filter of the plurality of Bloom filters; modifying at least a portion of the plurality of Bloom filters to create a modified Bloom filter array comprising a modified plurality of Bloom filters each of which having a same size, wherein the same size is greater than the size of the first Bloom filter, wherein said modifying comprises: duplicating the first Bloom filter to create a modified first Bloom filter comprising two or more concatenated copies of the first Bloom filter; obtaining a key for performing lookup in the Bloom filter array; computing a hash value of the key using a hash function, wherein the hash value is computed using a modulo computation using the same size as a divisor for the modulo computation; and accessing a bit in the hash value location in each Bloom filter of the modified Bloom filter array to determine lookup outcome in each Bloom filter, whereby the module value is computed once for the Bloom filter array and reused for determining lookup outcome for each Bloom filter in the Bloom filter array.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
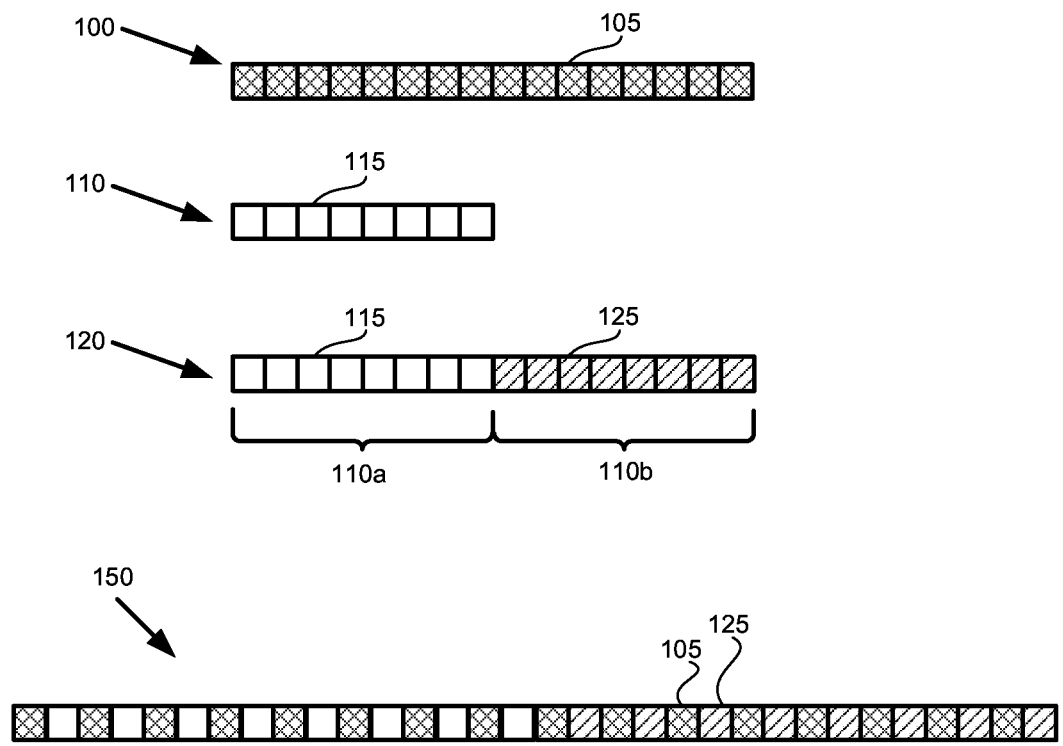
FIG. 1 shows a schematic illustration of Bloom filters, duplication and interleaving, in accordance with the disclosed subject matter.

One technical problem dealt with by the disclosed subject matter is to provide for an efficient manner to perform lookup in a Bloom filter array.

For ease of explanation, the disclosure below focuses on a specific embodiment which uses a Bloom filter array and requires performing lookup in such array. However, it will be noted that the disclosed subject matter is not limited to such embodiment.

Publish/subscribe (pub/sub) is a communication paradigm allowing users that produce and consume messages to interact in a decoupled fashion. In a broker-based topic-based pub/sub, message producers, also called "publishers", publish their messages on logical channels called "topics". Message consumers, also called "subscribers", subscribe to the topics that are of interest to them, and receive messages published on those topics of choice. Publishers and subscribers are decoupled because they don't need to know the network address of one another, only the topic identifier on top of which they communicate. A cluster of N brokers (also referred to as servers) is collectively operating to provide publish-subscribe service to the clients. The cluster of servers forms a unified pub/sub domain. That is, a message published on a given topic by a client connected to one server, should be received by all the clients subscribing to this topic, regardless of the server they are connected to. In order to achieve that a server must forward messages published by local clients (client connected to the server) to the servers that are connected to the subscribing clients. Routing information may be available to each server depicting for each other N−1 servers, which topics are relevant to their subscribers. Once a message is received, the routing information is used to identify to which one or more servers the message should be forwarded.

Each server may represents its subscription list using a Bloom filter, and disseminate the filter to all other servers. When a server needs to route a locally published message on a topic T, it may match the topic name T with each one of the Bloom filters it received from its peer servers in the cluster. Every positive match may result in forwarding the message to the server that supplied it. The server may manage its own subscription list using a counting Bloom filter, where deleting an item (subscription) is supported, and convert to a (standard, non-counting) Bloom filter only in order to transmit to the cluster. In view of their compact size, Bloom filters may require a reduced amount of memory and bandwidth resources, in comparison to transmitting an exact subscription list and a Bloom filter array of N−1 filters may be used by each server to route the message appropriately. However, performing a lookup in the Bloom filter array may be inefficient due to various reasons.

Hardware implementations of routing based on Bloom filters may lend themselves to parallel evaluation of filters, since the number of targets (output ports) is usually fixed, and the Bloom filter parameters are fixed in advance. In hardware, independent devices on the chip are accessed in parallel with no significant detrimental consequences. However, in software implementations, and in particular for routing in dynamic clusters or when the number of Bloom filters or size thereof changes over time, the problem may be much harder.

The number of servers (N) is dynamic and unknown in advance. In addition, in large Bloom filters the k addresses may be far between, which may reduce the effectiveness of on-CPU and off-CPU caches. Performing these steps on (N−1) filters, corresponding to (N−1) remote servers, may result in the worst case in (N−1)*k hash computations and (N−1)*k memory accesses that go all the way to the main memory. Moreover, the Bloom filters supplied by the remote servers may be of different lengths which may complicate the problem even further.

One technical solution is to modify size of Bloom filters in a Bloom filter array so as to have an identical size by duplicating the content of the Bloom filters. The duplication of Bloom filters may increase a size of the Bloom filter without affecting the false positive rate of the Bloom filter. A duplicated Bloom filter may comprise two more identical copies of the original Bloom filter concatenated one after the other.

In some exemplary embodiments, the Bloom filters are not the same size. This may happen because each Bloom filter may be adjusted to a filter size as the number of elements in the filter increases or decreases, in order to maintain a false positive rate within a certain range while conserving memory resources. A pub/sub server may update the size of its Bloom filter dynamically according to the number of elements inserted therein.

If the length $L_1$ of Bloom filter $B_1$ and the length $L_2$ of filter $B_2$ are different, then the same hash function value may not be usable when accessing the bit in the Bloom filter defined by the k-th hash function, $F_k$, since in general ($F_k$ mod $L_1$)!=($F_k$ mod $L_2$). $F_k$ may be a hash function producing a wide enough output (e.g., at least max $\{L_1, L_2\}$ width). In case the size of Bloom filter $B_1$ is an integer multiple of filter $B_2$ ($L_2*A=L_1$, where A>0 is an integer), the same hash function value may be used. In such a case, the relevant bit location for the $F_k$ hash function value may be i=($F_k$ mod $L_i$) for $L_1$ Bloom filter, and (j=$F_k$ mod $L_2$) for $L_2$ Bloom filter. However, in view of the relation between L1 and L2, j=i mod $L_2$, and therefore i=a*$L_2$+j, for some a in [0,(A−1)]. In view of the above, if the smaller filter $B_2$ is duplicated A times and concatenated the copies to form a filter $B_2$*A of size $L_1$ bits, then lookup into index j in the smaller filter $B_2$ of size $L_2$, will yield the same bit as lookup into index i of the bigger filter $B_2$*A.

In general, for interleaving M filters with different lengths in a filter bank, each filter $B_i$ may be duplicated by a factor $a_i*L_i$, such that $a_j*L_j=a_i*L_i=L_B$, for any two filters i,j. The index=($F_k$ mod $L_B$) may be used in order to access each Bloom filter. As is described herein below, the Bloom fitler array may be interleaved thereby the index may be used to fetch an M bit block that contains the corresponding bits from all the filters.

In some exemplary embodiments, a practical way to manage this is to have the servers publishing the Bloom filters to start from a fixed minimal length $L_0$, and have them increase the length only by multiplying by an integer factor A. That is, Li=$L_0*A^i$. This approach also has the benefit that the largest filter never needs to be duplicated. For example, $L_0$=1024 and A=2 yields filter lengths of the form $2^X$ starting from $2^{10}$, where the maximal size is of the form $2^{Max}$, Max≥10.

In some exemplary embodiments, the Bloom filter array may comprise Bloom filters having a same number of hash functions and a same set of hash functions. Utilizing Bloom filter array having the same set of hash functions may allow for reduction in computation of hash values. In some exemplary embodiments, in case there are K hash functions and M Bloom filters, instead of requiring M*K computations, K computations may be performed to compute K hash values $F_k$ ($1 \leftarrow k \leftarrow K$). The same hash value $F_k$ may be used to access different Bloom filters of the same Bloom filter array.

In some exemplary embodiments, the Bloom filters of the Bloom filter array may be arranged in an interleaved manner so as to reduce likelihood of cache misses and increase likelihood that all accessed bits may be retained in a cache mechanism of the processor. In some exemplary embodiments, bits of the M Bloom filters may be grouped together, such that the i-th bit of filter m, $B_m(i)$, is right next to the i-th bit of filter m+1, $B_{m+1}(i)$, in memory. Such memory arrangement may reduce access time when accessing the $F_k$ bit in the in each Bloom filter in view of an increased usage of a cache mechanism. In some exemplary embodiments, accessing the i-th bit of filter $B_1$ is likely to pre-fetch the i-th elements of filters $B_2$-$B_M$ into the cache, and possibly into a CPU register. For example, if M←64, all the i-th bits of all the filters can be packed into a single 64 bit word. Loading this word is likely to bring into a CPU register all the bits at once, and hence checking them results in a relatively fast operation. Even if M>64, accessing bits $B_1(i)$ to $B_{64}(i)$ (the first 64-bit word), is likely to prefetch the next word as well, therefore making the access to bits $B_{65}(i)$ to $B_{128}(i)$ much faster in comparison to accessing a non-interleaved version of the Bloom filter array. It will be noted that modern computers often prefetch an entire cache line (typically 64 Bytes), which may speed up the access to $B_1(i)$ until $B_M(i)$.

One technical effect of utilizing the disclosed subject matter is to support efficient lookup in Bloom filter arrays comprising Bloom filters of different sizes, which may be modified dynamically according to a desired false positive rate or range of desired rates. The disclosed subject matter may be useful in reducing access time and computation time when performing lookup in Bloom filter arrays.

Another technical effect of utilizing the disclosed subject matter is to increase lookup efficiency in routing-based Bloom filter arrays, such as in case of pub/sub servers using Bloom filters to determine routing of messages. Additionally or alternatively, lookup efficiency is improved also in storage-related embodiments, where Bloom filters are used to determine location of a retained item.

Referring now to FIG. 1 showing an illustration of Bloom filters, in accordance with the disclosed subject matter.

Bloom filter array may comprise at least two filters: Bloom Filter (BF) 100 and BF 110. BF 100 is of larger size than BF 110. The size of BF 100 may be dividable by the size of BF 110 (e.g., Size($BF_{100}$)=Size($BF_{110}$)*A). For simplicity, the Size of BF 100 may be twice the size of BF 110. However, the disclosed subject matter is not limited to such an embodiment.

In relation to one hash function $F_k$, the value of the hash function $F_k(S)$, is used to define a bit in the BF which is indicative of whether or not the BF includes an item corresponding to string S or not. The same value may be used for the different BFs of the same Bloom filter array as the same hash function may be used for all BFs of the Bloom filter array. In BF 100, the bit is encoded in Cell 105, while in BF 110, the bit is encoded in Cell 115. The location of Cell 115 is obtainable by performing modulo operation on the location of Cell 105.

BF 120 is a Bloom filter comprising two identical copies of BF 110 concatenated one after the other (110a, 110b). Though BF 120 is of larger size than BF 110, the rate of false positive therein is the same as in BF 110.

As BF 120 comprises duplicates of BF 110, both Cell 115 and Cell 125 may be used as indication as to whether BF 110 includes item it or not. As can be appreciated, Cell 125 is at the same location as Cell 105 of BF 105 thereby avoiding the need to perform modulo operation to obtain the location in BF 120.

BF 100 and BF 120 may be encoded into a single Interleaved Bit Array (IBA) 150. In IBA 150, all bits of all the BFs of the Bloom filter array are grouped together in consecutive manner. In the example of a Bloom filter array of two BFs, The first bit of IBA 150 is the first bit of BF 100, the second bit is the first bit of BF 120, the third bit is the second bit of BD 100, the fourth bit is the second bit of BF 120 and so forth. As can be appreciated, the bits corresponding to Cells 105 and 125 are grouped together thereby increasing likelihood that these bits are retrieved together in a single memory access to the registers of the processor when attempting to determine their value.

It will be noted that FIG. 1 refers to a value of one hash function, however, the Bloom filter array may likely make use of several hash functions, as is known in the art. By duplicating a Bloom filter, the value of each hash function can be used as is without additional computations.

Figure 2:
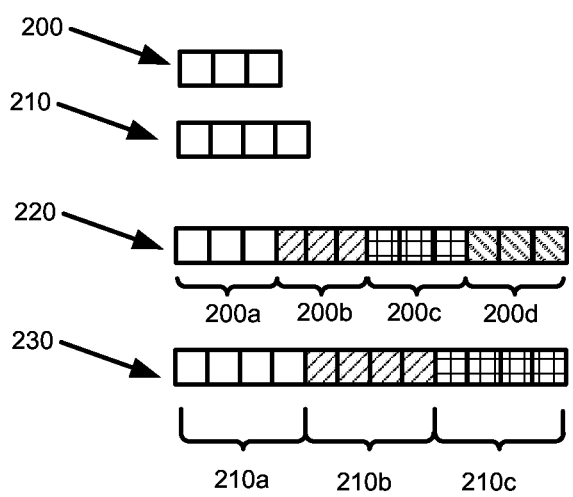
FIG. 2 shows a schematic illustration of Bloom filters and duplication, in accordance with the disclosed subject matter.

Referring now to FIG. 2 showing an illustration of Bloom filters, in accordance with the disclosed subject matter. FIG. 2 exemplifies two BFs having sizes that none of which is a divider of the other. In this example, BF 200 is of size 3 and BF 210 is of size 4. A common multiplier may be determined, such as a least common multiplier-12. Based upon the common multiplier, each BF is duplicated so as to be of the size of the common multiplier. BF 200 is duplicated three times so to have a total of four identical copies arranged in sequence (200a, 200b, 200c and 200d forming BF 220). BF 210 is duplicated two times so as to have a total of three identical copies arranged in sequence (210a, 210b and 210c forming BF 230). In such a manner, all Bloom filters of a single Bloom filter array may be modified to have a single same size.

It will be noted that duplication is relatively easy task computationally, as opposed to increasing the size of a Bloom filter which may require to re-encode all items in potentially different bits.

Figure 3:
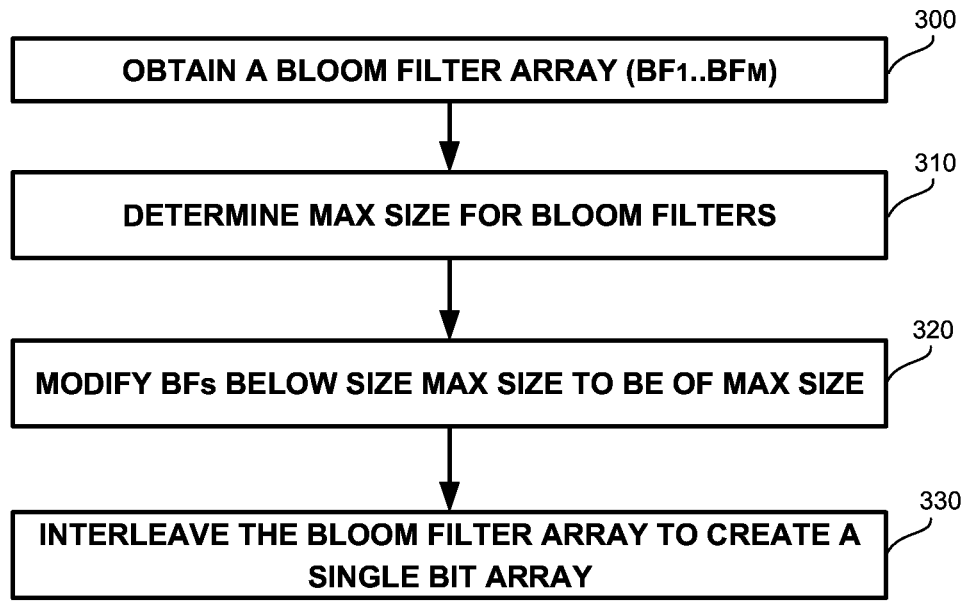
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

In Step 300, a Bloom filter array may be obtained. The Bloom filter array may comprise a set of Bloom filters, each of which potentially having a different size ($BF_i$ having a size $L_i$, $1 \leq i \leq M$). In some exemplary embodiments, each Bloom filer of the Bloom filter array may use a same number of hash functions and the same hash functions to encode items into the filter. The size of the Bloom filters may be defined so as to ensure that the false positive rate may be below a predetermined maximal threshold. In some cases, one Bloom filter may encode a smaller number of items than a second Bloom filter, and in view of the maximal false positive rate threshold requirement, the second Bloom filter may be of a larger size than the first Bloom filter.

In some exemplary embodiments, the Bloom filters may represent a set of subscriptions in a pub/sub server. Each server may generate a Bloom filter and the set of filters together may form the Bloom filter array used for making routing decisions by a single server determining to which servers a message of a specific topic is to be routed.

In Step 310, a maximal size of the Bloom filters is determined. The maximal size may be a size that is dividable by the size of each filter in the array. In some exemplary embodiments, the size is a least common multiple of the sizes $L_1 \ldots L_M$ may be computed as used as the maximal size. In some cases, the size of each Bloom filter may be an exponent of 2 (e.g., of the form $2^1$), and the maximal size may be of the form $2^{Max}$.

In Step 320, each Bloom filter of the array which is of a smaller size than the maximal size is modified. The Bloom filter may be modified by duplicating its array of bits at least once to create a modified Bloom filter comprising two or more concatenated identical copies of the bit array of the Bloom filter.

In Step 330, the set of Bloom filters in the modified Bloom filter array may be interleaved to a single array of bits. The single array of bits may be created by interleaving bits of the Bloom filters of the modified Bloom filter array so as to group bits of the same location from different Bloom filters together. In some exemplary embodiments, assuming M Bloom filters having a same size of L bits, a single array of size M*L may be created. Bit i of Bloom Filter number k may be copied to bit (i−1)*M+k of the single array. The single bit array may group all the i-th bits of M Bloom filters together. Based on such grouping, access to the i-th bit of one Bloom filter may cause the i-th bits of other Bloom filters to be cached and thereby avoid additional expensive memory accesses.

Figure 4:
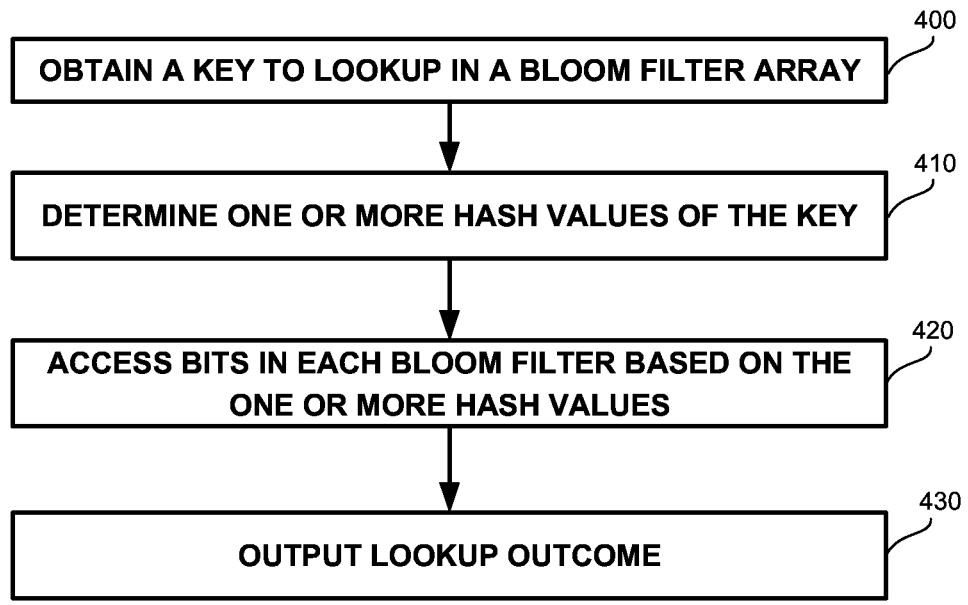
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

In Step 400, a key for performing lookup in the Bloom filter array may be obtained. In some exemplary embodiments, the key may be a topic of a message to be routed in a topic-based pub/sub system. The Bloom filter array may represent sets of topics to be routed to each server in the pub/sub system. In some exemplary embodiments, the key may be a file name of a file retained to be retrieved from a distributed storage device. The Bloom filter array may represent sets of storage devices where the file may be retained and each such Bloom filter may comprise the names of the files that are retained by the corresponding storage device.

The Bloom filter array may comprise Bloom filters having a same size, such as in view of a modification performed in accordance with the disclosed subject matter.

In Step 410, a hash value of the key may be obtained. The hash value may be computed using a modulo computation. In some exemplary embodiments, the hash value may be computed as f(key) mod size, where f( ) is some function operated on key (optionally a hash function, such as SHA-1, Tiger, MD5, or the like), size is the size of the Bloom filters which is used as a divisor for the modulo operation to ensure the hash value is a location in a bit array of size size. The hash value may be computed once and re-used for all Bloom filters of the Bloom filter array. In some exemplary embodiments, several hash values may be obtained with respect to a plurality of hash functions.

In Step 420, a bit in the hash value location in each Bloom filter may be accessed to determine lookup outcome. In some exemplary embodiments, positive lookup outcome is provided if all respective bits in a Bloom filter of all hash functions are turned on (e.g., set to one). In some exemplary embodiments, accessing bit i of $BF_k$ may cause bit i of other Bloom filters, such as $BF_{k+1}$, $BF_{k+64}$, or the like to be fetched to memory or pre-fetched to memory, thereby reducing memory access time of consecutive access attempts to such bits. In some exemplary embodiments, assuming l hash functions, $i_1 \ldots i_l$ may be the computed locations of each hash function $1 \ldots l$, $BF_1(i_1) \ldots BF_M(i_1)$ may be accessed before accessing $BF_1(i_2) \ldots BF_M(i_2)$, which may be accessed before accessing $BF_1(i_3) \ldots BF_M(i_3)$ and so forth.

In Step 430, lookup outcome may be outputted such as indicating for which Bloom filter of the array a positive result is determined and for which Bloom filter a negative result is determined.

Figure 5:
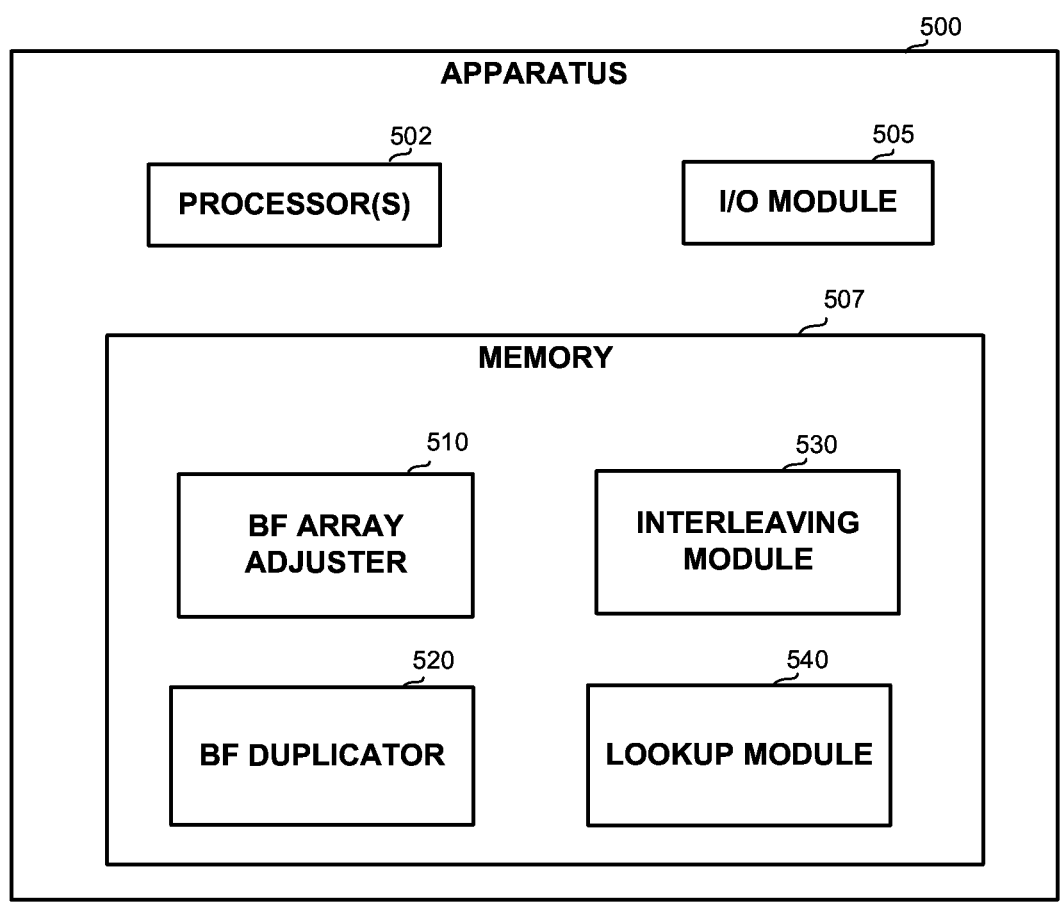
FIG. 5 shows a block diagram of an apparatus, in accordance with some exemplary embodiments of the disclosed subject matter.

Referring now to FIG. 5 showing a block diagram of an apparatus, in accordance with some exemplary embodiments of the disclosed subject matter. An Apparatus 500 may be configured to perform lookup using Bloom filter array as a lookup table.

In some exemplary embodiments, Apparatus 500 may comprise one or more processor(s) 502. Processor 502 may be a Central Processing Unit (CPU), a microprocessor, an electronic circuit, an Integrated Circuit (IC) or the like. Processor 502 may be utilized to perform computations required by Apparatus 500 or any of it subcomponents.

In some exemplary embodiments of the disclosed subject matter, Apparatus 500 may comprise an Input/Output (I/O) Module 505. I/O Module 505 may be utilized to provide output to and receive input from a user or another Apparatus 500 in communication therewith.

In some exemplary embodiments, Apparatus 500 may comprise a Memory 507. Memory 507 may be a hard disk drive, a Flash disk, a Random Access Memory (RAM), a memory chip, or the like. In some exemplary embodiments, Memory 507 may comprise a cache memory (not shown) that provides faster access to data retained in cache lines. In some exemplary embodiments, Memory 507 may retain program code operative to cause Processor(s) 502 to perform acts associated with any of the subcomponents of Apparatus 500.

Bloom Filter Array Adjuster 510 may be configured to adjust a Bloom filter array comprising a plurality of Bloom filters having different sizes to an adjusted Bloom filter array comprising Bloom filters having the same size. Bloom Filter Array Adjuster 510 may utilize Bloom Filter Duplicator 520 to adjust a size of a Bloom Filter in the array.

Bloom Filter Duplicator 520 may be configured to duplicate a Bloom Filter to create a new Bloom filter comprising sequential and identical copies of the Bloom filter, whereby increasing the size of the Bloom Filter to be a*size instead of size, for some integer a>1.

Interleaving Module 530 may be configured to interleave the Bloom filters of the adjusted array to a bit array interleaving bits from different Bloom filters to be stored together. In some exemplary embodiments, partial interleaving may be implemented instead of full interleaving. In some exemplary embodiments, 100 Bloom filters where the first five hash functions are the same but the sixth hash function is different. The Bloom filters may still be grouped together although the interleaving may not be relevant for the sixth hash functions.

Lookup Module 540 may be configured to perform lookup in a Bloom filter array. In some exemplary embodiments, Lookup Module 540 may compute a single hash value for each common hash function and avoid performing duplicate computations. Lookup Module 540 may access the interleaved bit array in a manner configured to increase usage of the cache mechanism of Memory 507.

In some exemplary embodiments, in case of partial interleaving, the hash functions may be ordered so as the common group is accessed first before accessing the non-common hash functions. This may be improve performance as a false response on any of the common hash functions may define a false result for the lookup operation. The non-common hash functions may be accessed only in case all the common hash functions provide positive result.

Figure 6A:
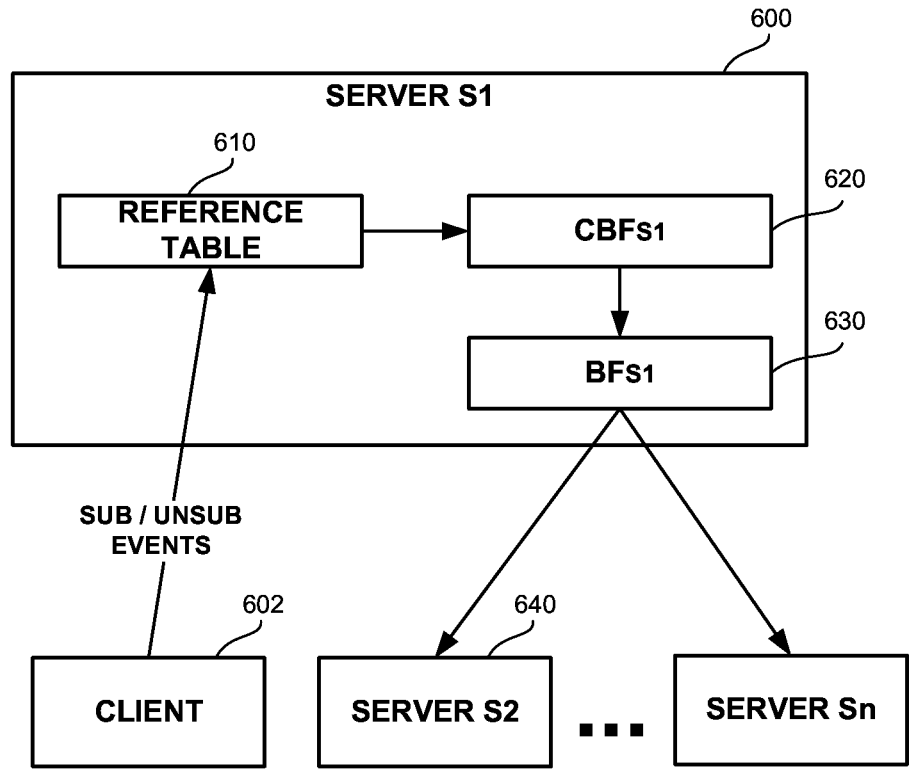
FIGS. 6A and 6B show block diagrams of servers in a pub/sub system, in accordance with some exemplary embodiments of the disclosed subject matter.

Referring now FIG. 6A showing a block diagram of a server, in accordance with the disclosed subject matter. Server 600, denoted as S1, may be part of a pub/sub network of N servers, such as S1, S2, ..., Sn.

Server S1 600 may receive subscription events from client devices, such as Client 602, and may update a Reference Table 610 to indicate which client is subscribed on which topic. In some exemplary embodiments, unsubscribe events may also be received in which a client requests to be removed from a topic subscription. Reference Table 610 may provide a precise lookup table indicating for each topic, a list of client subscribers.

Based on Reference Table 610, Server S1 600 may define an approximated lookup table using a CBF, indicating a set of topics to which clients of Server S1 600 are subscribed. $CBF_{S1}$ 620 may be a counting Bloom filter used as the approximated lookup table. $CBF_{S1}$ 620 may support both addition and removal of topics therefrom without requiring re-computation of the filter.

In some exemplary embodiments, when a filter is to be distributed to other servers, such as Server S2 640 ... Server Sn, or the like, a $BF_{S1}$ 630 of a reduced size may be computed and distributed. $BF_{S1}$ 630 may be computed by performing logical folding of $CBF_{S1}$ 620. The reduced size may be a size that is sufficient to provide, for the number of items entered to the filter, a desired maximal false positive rate. As is known in the art, Bloom filter having m cells, using k hash functions, and having n items, may provide a different false positive rate. For example, k=4, m/n=4 provides a false positive ratio of 0.160. As another example, k=4, m/n=15 provides a ratio of 0.003. When $BF_{S1}$ 630 is computed, the value of k and n is known and fixed, while the value of m may be minimized to a value which still provides a false positive ratio below a desired threshold.

Figure 6B:
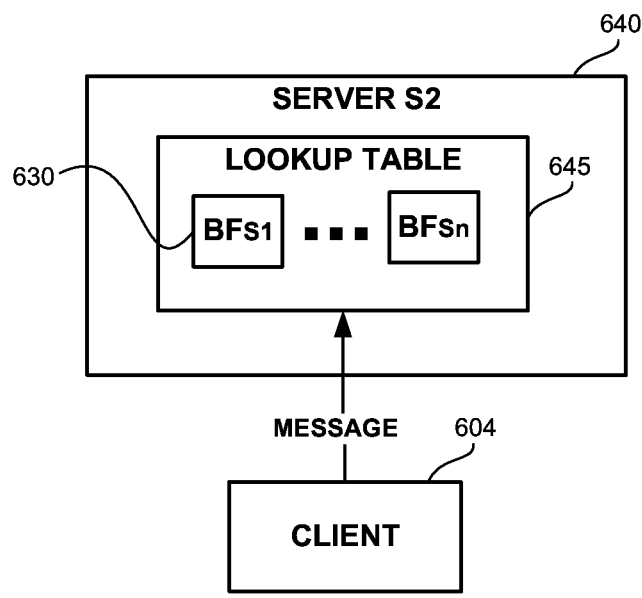

Referring now to FIG. 6B, showing a block diagram of a server, in accordance with the disclosed subject matter. Server S2 640 retains an approximated lookup table, Lookup Table 645 which is based on Bloom filters. Lookup table may comprise a Bloom Filter for each server: $BF_{S1}$ 630 representing Server S1 630, ... $BF_{Sn}$ representing Server Sn. In some exemplary embodiments, Server S2 may or may not comprise a BF representing itself. Additionally or alternatively, Server S2 may comprise CBF, similar to $CBF_{S1}$ 620. Additionally or alternatively, Server S2 may comprise Reference Table, similar to 610, so as to provide precise lookup of its subscribers, when needed. In some exemplary embodiments, the Bloom filter array forming Lookup Table 645 may be comprised of Bloom filters of different sizes. Server S2 640 may update the Bloom filters to enlarge their size using duplication. Additionally or alternatively, the Bloom filters of the array may be interleaved.

Upon receipt of a message from a client device, Client 604, a topic of the message may be determined. Server S2 640 may determine which of its direct subscribers are subscribed to the topic, such as based on a reference table (not shown). Additionally or alternatively, Server S2 640 may determine to which other server the message should be transmitted based on whether the other server has subscribers to the relevant topic. Server S2 640 may lookup in each BF of Lookup Table 645. If a BF of server Sm returns a positive result, than the message is transmitted to server Sm. Server Sm may identify to which of its direct clients the message is to be transmitted. In some exemplary embodiments, Server Sm may have no such clients at all and the positive result may be an outcome of a false positive error. Server Sm in such a case may drop the message and disregard it.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a processor, the method comprising:

obtaining a Bloom filter array comprising a plurality of Bloom filters, wherein each Bloom filter of the plurality of Bloom filters is an array of bits having a bit size, wherein the bit size comprises a count of bits in the array of bits, wherein a first bit size of a first Bloom filter of the plurality of Bloom filters is smaller than a second bit size of a second Bloom filter of the plurality of Bloom filters, wherein the Bloom filter array has a total bit size that is a sum of a number of bits of each Bloom filter of the plurality of Bloom filters in the Bloom filter array;

modifying at least a portion of the plurality of Bloom filters to create a modified Bloom filter array comprising a modified plurality of Bloom filters each of which having a same bit size comprising a same count of bits, wherein the same bit size is greater than the first bit size of the first Bloom filter, wherein said modifying comprises:

duplicating the first Bloom filter to create a modified first Bloom filter comprising two or more concatenated copies of the first Bloom filter, wherein said modifying is performed by the processor, wherein the modified Bloom filter array has a modified total bit size that is a sum of a number of bits of each Bloom filter in the modified plurality of Bloom filters, whereby the modified total bit size of the modified Bloom filter array is greater than the total bit size of the Bloom filter array;

obtaining a key for performing lookup in the Bloom filter array;

computing a hash value of the key using a hash function, wherein the hash value is computed using a modulo computation using the same bit size as a divisor for the modulo computation, whereby defining a hash value location applicable to all modified Bloom filters of the modified Bloom filter array; and accessing a bit in the hash value location in each Bloom filter of the modified Bloom filter array to determine lookup outcome in each Bloom filter;

whereby the hash value location is computed once for the modified Bloom filter array and reused for determining lookup outcome for each Bloom filter in the modified Bloom filter array.

2. The computer-implemented method of claim 1, wherein each Bloom filter is an array of bits, wherein said modifying further comprises:
   interleaving bits of the modified plurality of Bloom filters such that bits of different Bloom filters of the modified plurality of Bloom filters that are in a same location are grouped together; whereby reducing access time when performing said accessing the bit in the hash value location in each Bloom filter in view of an increased usage of a cache mechanism of said processor.

3. The computer-implemented method of claim 1, wherein the bit size of each Bloom filter of the plurality of Bloom filters is an exponent of two.

4. The computer-implemented method of claim 3, wherein a largest bit size of a Bloom filter of the plurality of Bloom filters is $2^{Max}$, wherein said modifying comprises: duplicating each Bloom filter of the plurality of Bloom filters having a bit size smaller than $2^{Max}$ to modify the bit size to $2^{Max}$; wherein said modifying is performed without modifying the Bloom filter having the largest bit size in the Bloom filter array.

5. The computer-implemented method of claim 1, wherein said modifying comprises:
   determining a least common multiple of all bit sizes of the plurality of Bloom filters; and
   duplicating each Bloom filter of the plurality of Bloom filter so as to be modified to a bit size of the least common multiple.

6. The computer-implemented method of claim 1, wherein the first Bloom filter encodes a smaller number of items than the second Bloom filter, wherein the first and the second Bloom filters provide for a false positive rate within a predetermined bound.

7. The computer-implemented method of claim 1, wherein the Bloom filters array is used as a routing table, wherein each Bloom filter of the plurality of Bloom filters corresponds to a server;
   wherein said obtaining a key comprises obtaining the key from a message;
   wherein the bit in the hash value location of a modified Bloom filter is indicative of whether the message is to be transmitted to a server corresponding to the Bloom filter based upon which the modified Bloom filter was determined.

8. The computer-implemented method of claim 1,
   wherein the Bloom filters array is used as a lookup table of a storage, wherein each Bloom filter of the plurality of Bloom filters corresponds to a different storage location;
   wherein said obtaining a key comprises obtaining the key from an access request;
   wherein the bit in the hash value location of a modified Bloom filter is indicative of whether the access request is to be performed with respect to the storage location corresponding to the Bloom filter based upon which the modified Bloom filter was determined.

9. A computerized apparatus comprising:
   a memory, wherein said memory retains a Bloom filter array comprising a plurality of Bloom filters, wherein each Bloom filer of the plurality of Bloom filters is an array of bits having a bit size, wherein the bit size comprises a count of bits in the array of bit;
   wherein a first bit size of a first Bloom filter of the plurality of Bloom filters is smaller than a second bit size of a second Bloom filter of the plurality of Bloom filters, wherein the Bloom filter array has a total bit size that is a sum of a number of bits of each Bloom filter of the plurality of Bloom filters in the Bloom filter array;
   and
   a processor, wherein said processor is configured to:
      modify at least a portion of the plurality of Bloom filters to create a modified Bloom filter array comprising a modified plurality of Bloom filters each of which having a same bit size comprising a same count of bits, wherein the same bit size is greater than the first bit size of the first Bloom filter, wherein said modifying comprises:
         duplicating the first Bloom filter to create a modified first Bloom filter comprising two or more concatenated copies of the first Bloom filter, wherein said modifying is performed by the processor, wherein the modified Bloom filter array has a modified total bit size that is a sum of a number of bits of each Bloom filter in the modified plurality of Bloom filters, whereby the modified total bit size of the modified Bloom filter array is greater than the total bit size of the Bloom filter array;
      obtain a key for performing lookup in the Bloom filter array; computing a hash value of the key using a hash function, wherein the hash value is computed using a modulo computation using the same bit size as a divisor for the modulo computation, whereby defining a hash value location applicable to all modified Bloom filters of the Bloom filter array; and
      accessing a bit in the hash value location in each Bloom filter of the modified Bloom filter array to determine lookup outcome in each Bloom filter, whereby the hash value location is computed once for the modified Bloom filter array and reused for determining lookup outcome for each Bloom filter in the Bloom filter array.

10. The computerized apparatus of claim 9, wherein said processor us further configured to:
    obtain an original Bloom filter array comprising a set of original Bloom filters, each of which is an array of bits having a bit size not larger than the same bit size, wherein the bit size comprises a count of bits in the array of bits, wherein the set of original Bloom filters comprise a first Bloom filter and a second Bloom filter, wherein a first bit size of the first Bloom filter is smaller than a second bit size of the second Bloom filter;
    modify the original Bloom filter array to create the Bloom filter array, wherein during the modification, the at least one Bloom filter is created by duplicating content of the first Bloom filter of the set of original Bloom filters.

11. A computerized apparatus having a processor, the processor being adapted to perform the steps of:
    obtaining a Bloom filter array comprising a plurality of Bloom filters, wherein each Bloom filter of the plurality of Bloom filters is an array of bits having a bit size, wherein the bit size comprises a count of bits in the array of bits, wherein a first bit size of a first Bloom filter of the plurality of Bloom filters is smaller than a second bit size of a second Bloom filter of the plurality of Bloom filters, wherein the Bloom filter array has a total bit size that is a sum of a number of bits of each Bloom filter of the plurality of Bloom filters in the Bloom filter array;

modifying at least a portion of the plurality of Bloom filters to create a modified Bloom filter array comprising a modified plurality of Bloom filters each of which having a same bit size comprising a same count of bits, wherein the same bit size is greater than the first bit size of the first Bloom filter, wherein said modifying comprises:

duplicating the first Bloom filter to create a modified first Bloom filter comprising two or more concatenated copies of the first Bloom filter, wherein the modified Bloom filter array has a modified total bit size that is a sum of a number of bits of each Bloom filter in the modified plurality of Bloom filters, whereby the modified total bit size of the modified Bloom filter array is greater than the total bit size of the Bloom filter array;

obtaining a key for performing lookup in the Bloom filter array;

computing a hash value of the key using a hash function, wherein the hash value is computed using a modulo computation using the same bit size as a divisor for the modulo computation, whereby defining a hash value location applicable to all modified Bloom filters of the modified Bloom filter array; and accessing a bit in the hash value location in each Bloom filter of the modified Bloom filter array to determine lookup outcome in each Bloom filter, whereby the hash value location is computed once for the modified Bloom filter array and reused for determining lookup outcome for each Bloom filter in the modified Bloom filter array.

12. The computerized apparatus of claim 11, wherein each Bloom filter is an array of bits, wherein said modifying further comprises:

interleaving bits of the modified plurality of Bloom filters such that bits of different Bloom filters of the modified plurality of Bloom filters that are in a same location are grouped together;

whereby reducing access time when performing said accessing the bit in the hash value location in each Bloom filter in view of an increased usage of a cache mechanism of said processor.

13. The computerized apparatus of claim 11, wherein a largest bit size of a Bloom filter of the plurality of Bloom filters is $2^{Max}$, wherein said modifying comprises:

duplicating each Bloom filter of the plurality of Bloom filters having a bit size smaller than $2^{Max}$ to modify the bit size to $2^{Max}$; wherein said modifying is performed without modifying the Bloom filter having the largest bit size in the Bloom filter array.

14. The computerized apparatus of claim 11, wherein said modifying comprises:

determining a least common multiple of all bit sizes of the plurality of Bloom filters; and duplicating each Bloom filter of the plurality of Bloom filter so as to be modified to a bit size of the least common multiple.

* * * * *